US012665182B2

(12) United States Patent
Zhang et al.

(10) Patent No.: US 12,665,182 B2
(45) Date of Patent: Jun. 23, 2026

(54) METHODS AND SYSTEMS FOR A LITHIUM-ION BATTERY CELL CATHODE

(71) Applicant: A123 Systems LLC, Novi, MI (US)

(72) Inventors: Linghong Zhang, St. Paul, MN (US); Xiangyang Zhu, Waltham, MA (US); Taehwan Yu, Santa Clara, CA (US); Fanqun Li, Hangzhou (CN); Yang Chen, Windsor (CA); Xiaochong Zhou, Hangzhou (CN)

(73) Assignee: A123 SYSTEMS LLC, Novi, MI (US)

( * ) Notice: Subject to any disclaimer, the term of this patent is extended or adjusted under 35 U.S.C. 154(b) by 621 days.

(21) Appl. No.: 18/153,985

(22) Filed: Jan. 12, 2023

(65) Prior Publication Data

US 2023/0238508 A1 Jul. 27, 2023

Related U.S. Application Data

(60) Provisional application No. 63/267,078, filed on Jan. 24, 2022.

(51) Int. Cl.
*H01M 10/0567* (2010.01)
*H01M 4/04* (2006.01)
*H01M 4/62* (2006.01)
*H01M 10/0525* (2010.01)

(52) U.S. Cl.
CPC ......... *H01M 4/0492* (2013.01); *H01M 4/624* (2013.01); *H01M 10/0525* (2013.01); *H01M 10/0567* (2013.01)

(58) Field of Classification Search
None
See application file for complete search history.

(56) References Cited

U.S. PATENT DOCUMENTS

| | | | |
|---|---|---|---|
| 9,966,598 B2 | 5/2018 | Cui et al. | |
| 2013/0288130 A1 | 10/2013 | Sheem et al. | |
| 2015/0364795 A1 | 12/2015 | Stefan et al. | |
| 2020/0044231 A1* | 2/2020 | Han ..................... | H01M 4/483 |

(Continued)

FOREIGN PATENT DOCUMENTS

| | | | |
|---|---|---|---|
| CN | 113036106 A | 6/2021 | |
| DE | 112017006921 T5 | 10/2019 | |

(Continued)

OTHER PUBLICATIONS

ISA Korean Intellectual Property Office, International Search Report Issued in Application No. PCT/US2023/060587, May 9, 2023, WIPO, 4 pages.

(Continued)

*Primary Examiner* — Carlos Barcena
(74) *Attorney, Agent, or Firm* — McCoy Russell LLP

(57) ABSTRACT

Systems and methods for a lithium-ion battery cell are disclosed. In one example, a method for forming a cathode for a lithium-ion battery cell includes forming a pre-lithiated cathode with a pre-lithiation reagent and positioning the pre-lithiated cathode in contact with an electrolyte. An electrolyte additive is injected into the electrolyte to form a passivation layer at the pre-lithiated cathode, the passivation layer inhibiting continued decomposition of the pre-lithiation reagent of the pre-lithiated cathode after completion of a formation cycle of the lithium-ion battery cell.

19 Claims, 10 Drawing Sheets

(56) References Cited

U.S. PATENT DOCUMENTS

2022/0013759 A1    1/2022  Chae et al.
2023/0327090 A1*  10/2023  Li ........................ H01M 4/5825
429/224

FOREIGN PATENT DOCUMENTS

EP        3793006 A1    3/2021
WO    2018232097 A1  12/2018
WO    2020132622 A1   6/2020

OTHER PUBLICATIONS

ISA Korean Intellectual Property Office, Written Opinion of the International Searching Authority Issued in Application No. PCT/US2023/060587, May 9, 2023, WIPO, 5 pages.
European Patent Office, Extended European Search Report Issued in Application No. 23743840.3, Jun. 30, 2025, Germany, 9 pages.

* cited by examiner

METHODS AND SYSTEMS FOR A LITHIUM-ION BATTERY CELL CATHODE

CROSS-REFERENCE TO RELATED APPLICATIONS

The present application claims priority to U.S. Provisional Application No. 63/267,078, entitled "METHODS AND SYSTEMS FOR A LITHIUM-ION BATTERY CELL CATHODE", and filed on Jan. 24, 2022. The entire contents of the above-listed application are hereby incorporated by reference for all purposes.

FIELD

The present description relates generally to a cathode for a lithium-ion battery cell

BACKGROUND AND SUMMARY

Lithium-ion (Li-ion) battery cells present a lightweight, compact, high performing alternative to conventional battery cells, such as those used in lead-acid batteries. The high performance of a Li-ion battery, formed of the Li-ion battery cells, includes desirable attributes such as increased charge cycles, high energy density, low self-discharge rate, as well as incorporation of less heavy metals compared to, for example, nickel-cadmium and nickel-metal hydride battery cells. As such, use of Li-ion batteries in electric and hybrid-electric vehicles is increasingly desirable. In particular, for fully electric vehicles, Li-ion batteries offer longer duration between recharging events. However, as the energy density of Li-ion batteries remains lower than that of gasoline, strategies to enhance their performance is desirable.

For example, battery cell energy density and cycling capacity may be affected by a composition and elemental distribution of a Li-ion battery cell cathode. By fabricating the cathode with high Li content, e.g., in excess of a transition metal content of the cathode, the cathode may have an increased energy density and cycling capacity relative to cathodes without excess Li. The excess Li may be introduced during a fabrication process of the cathode by adding a pre-lithiation reagent. Incorporation of Li into the cathode using the pre-lithiation reagent offers advantages from both safety and scalability perspectives: as to safety, cathode pre-lithiation precludes handling of volatile Li metal; and as to scalability, cathode pre-lithiation may be incorporated into existing cathode manufacturing processes with comparative ease. Furthermore, cathode pre-lithiation precludes reliance on additional manufacturing equipment, thereby circumventing increased costs.

However, direct inclusion of the cathode pre-lithiation reagent into cathode active material layer slurries may be plagued with other issues. As an example, in an ideal scenario, the pre-lithiation reagent may entirely decompose after completing the formation cycle of the battery cell. As decomposition occurs, gas may be generated which may be removed after the formation cycle by conducting a degassing procedure. However, in actuality, at least a portion of the pre-lithiation reagent may remain intact at the cathode surface and proceed to decompose during subsequent battery cell cycles.

Decomposition of the pre-lithiation reagent during battery cell operation may lead to undesirable gas release from the battery cell. In some examples, in order to facilitate decomposition of the pre-lithiation reagent, catalysts may be added (e.g., pre-lithiation catalysts). The catalysts may persist in the battery cell after the pre-lithiation reagent is decomposed and may also cause gas generation during battery cell operation due to an increase in cathode surface area resulting from a presence of the catalysts. In addition, the catalysts may promote electrolyte oxidation. As such, a strategy for deactivating any amount of pre-lithiation reagent remaining non-decomposed after executing a formation cycle of the battery cell may allow an electrochemical performance of the battery cell to be at least maintained. In particular, a strategy that does not adversely affect an amount of additional capacity provided by the pre-lithiation reagent or a cycling performance of the cathode, while providing beneficial capabilities that enhance the cycling performance, is desirable.

The inventors have identified the above problems and have determined solutions to at least partially solve them. In one example, a method for forming a cathode for a lithium-ion battery cell includes forming a pre-lithiated cathode with a pre-lithiation reagent, positioning the pre-lithiated cathode in contact with an electrolyte, and injecting an electrolyte additive into the electrolyte to form a passivation layer at the pre-lithiated cathode. The passivation layer may inhibit continued decomposition of the pre-lithiation reagent of the pre-lithiated cathode after completion of a formation cycle of the lithium-ion battery cell. In this way, undesirable reactions of the pre-lithiation reagent with electrolyte may be circumvented.

As an example, the electrolyte additive may be added to the electrolyte and oxidized during a charge cycle of the lithium-ion battery cell. The passivation layer is formed when the electrolyte additive is oxidized, which forms a barrier between the pre-lithiation reagent (e.g., the non-decomposed pre-lithiation reagent) and the electrolyte. Gas generation by the pre-lithiation reagent during operation of the lithium-ion battery cell is thereby mitigated. Furthermore, the passivation layer may suppress impedance growth, therefore enhancing an electrochemical performance of the lithium-ion battery cell.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
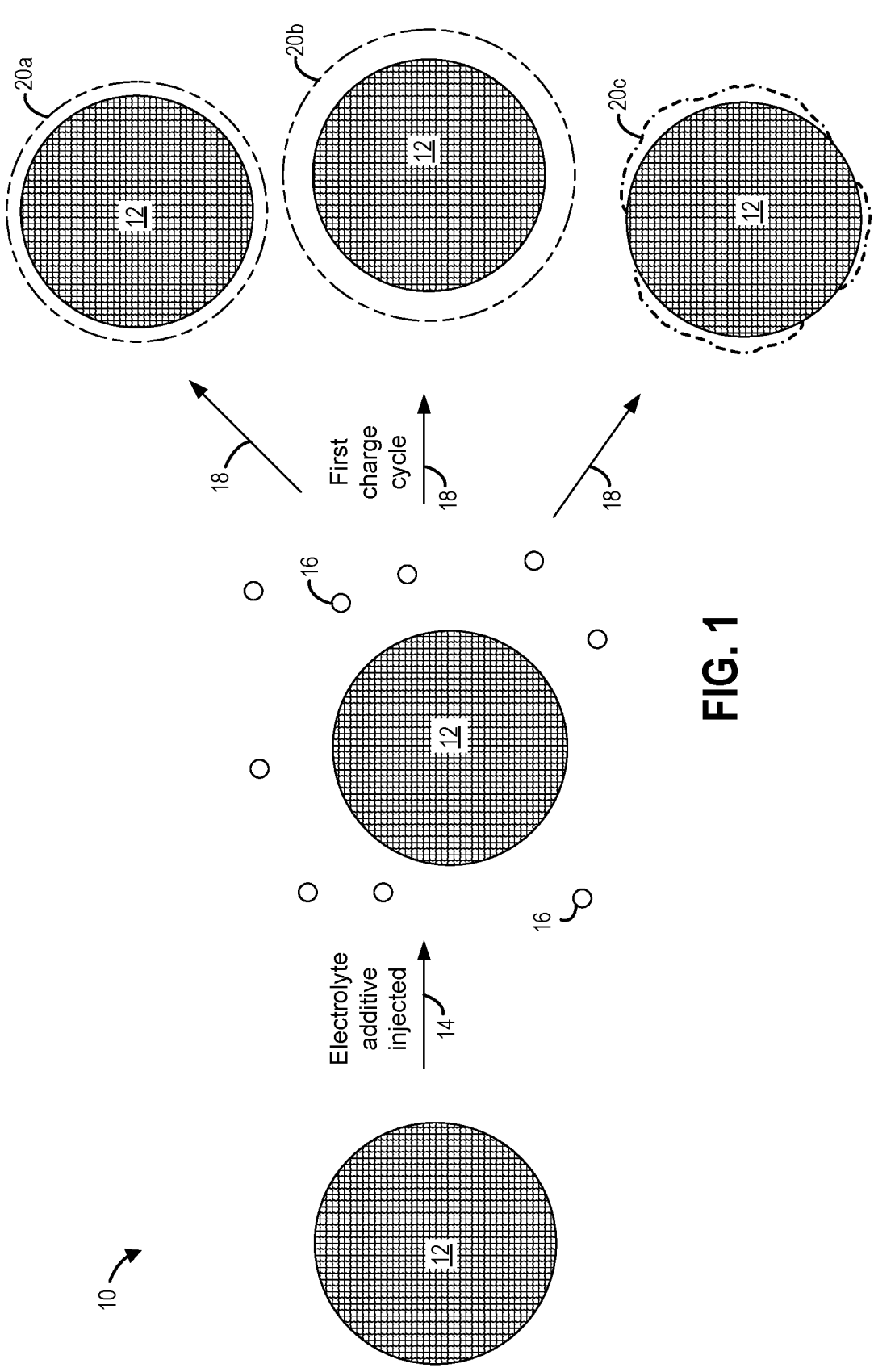
FIG. 1 shows an example of a process for forming a passivation layer over constituents of a pre-lithiated electrode for a Li-ion battery cell.
Figure 4:
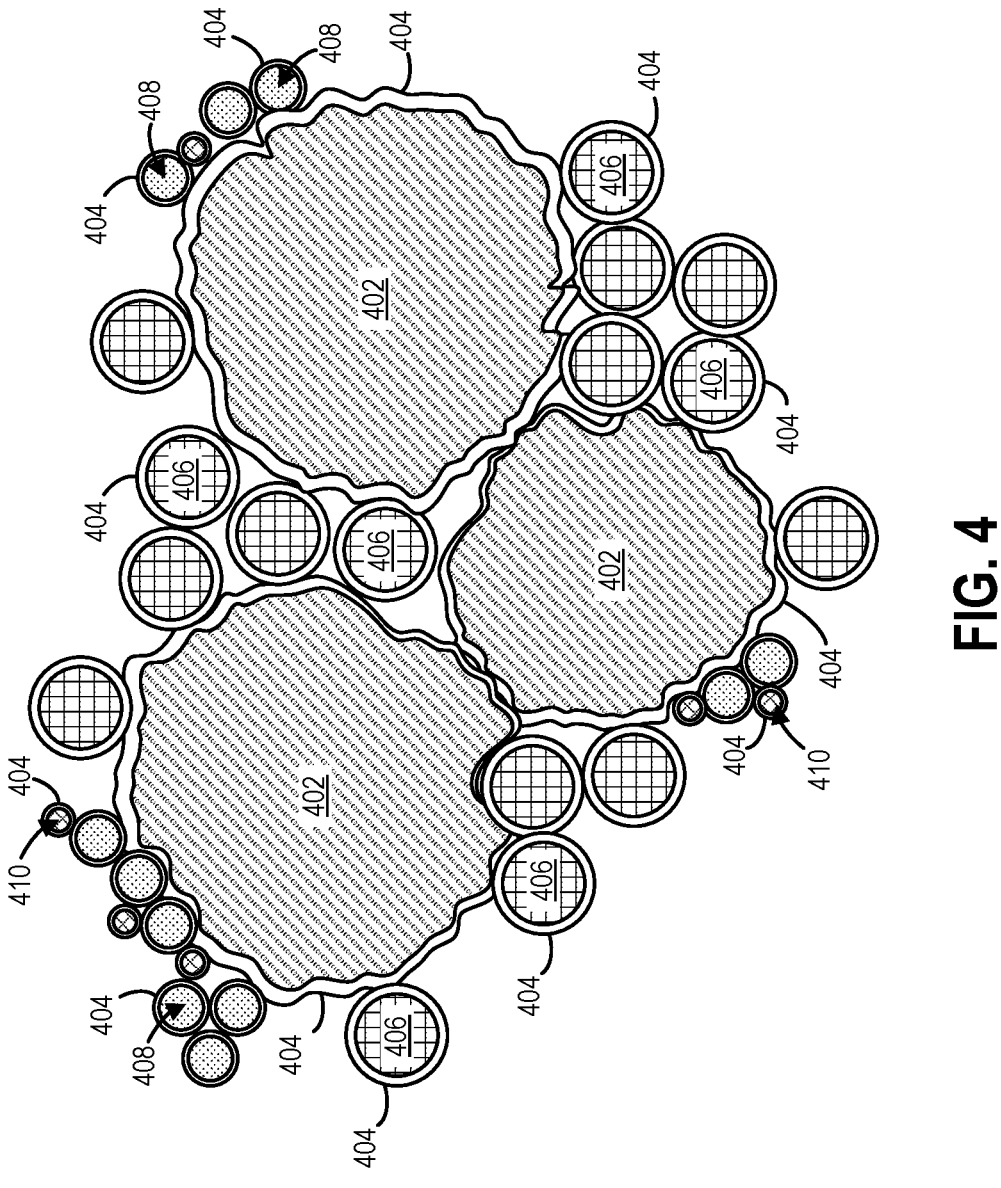
FIG. 4 shows a detailed view of particles of the electrode of FIG. 3A.
Figure 5:
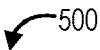
FIG. 5 shows an example of a method for forming a passivated pre-lithiated cathode.
Figure 5:
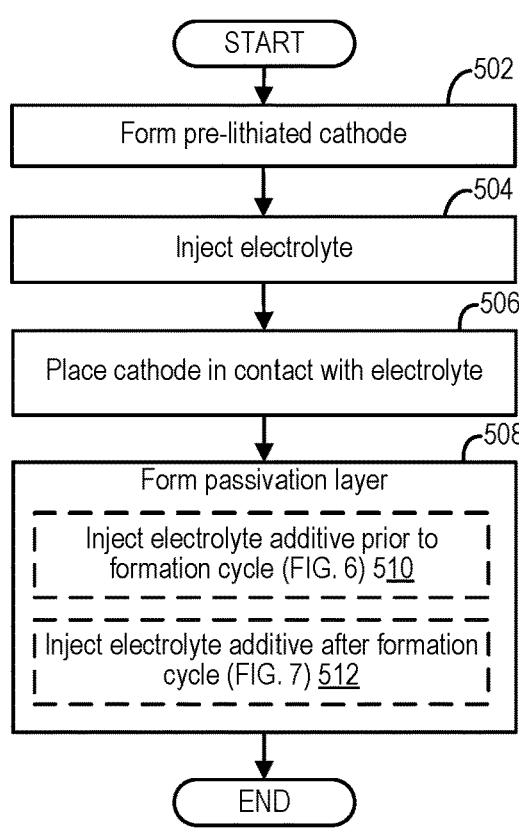
Figure 6:
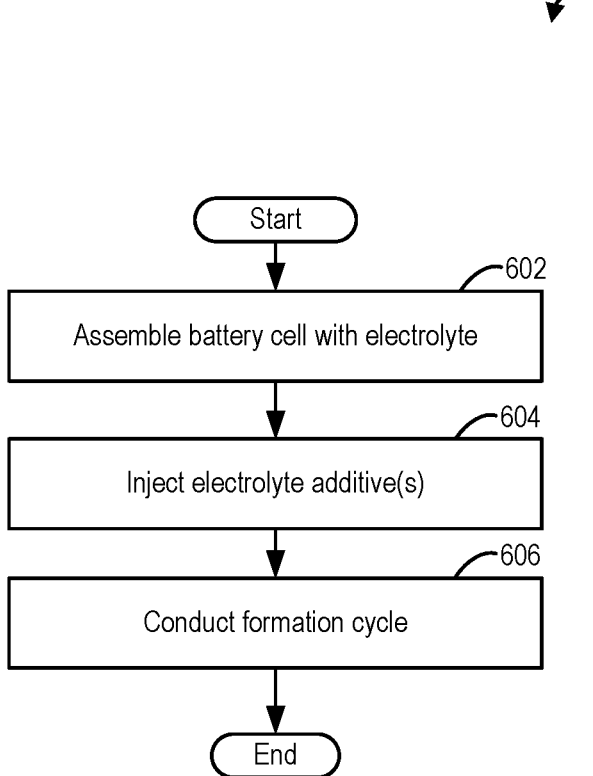
FIG. 6 shows a first example of a process for forming a passivation layer of the pas sivated pre-lithiated cathode.
Figure 7:
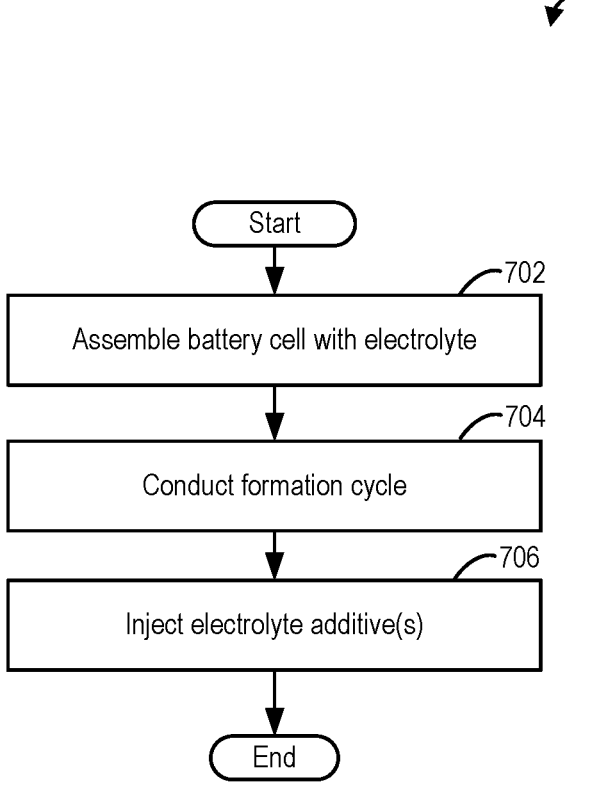
FIG. 7 shows a second example of a process for forming the passivation layer of the pas sivated pre-lithiated cathode.
Figure 9:
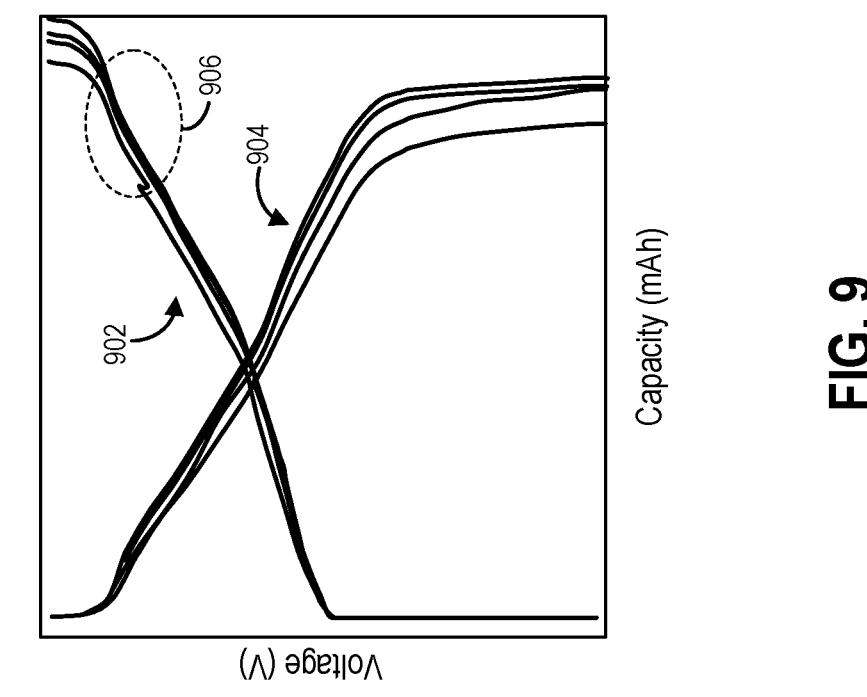
FIG. 9 shows a second graph plotting voltage profile of a Li-ion battery formed of cells with the passivation layer.
Figure 8:
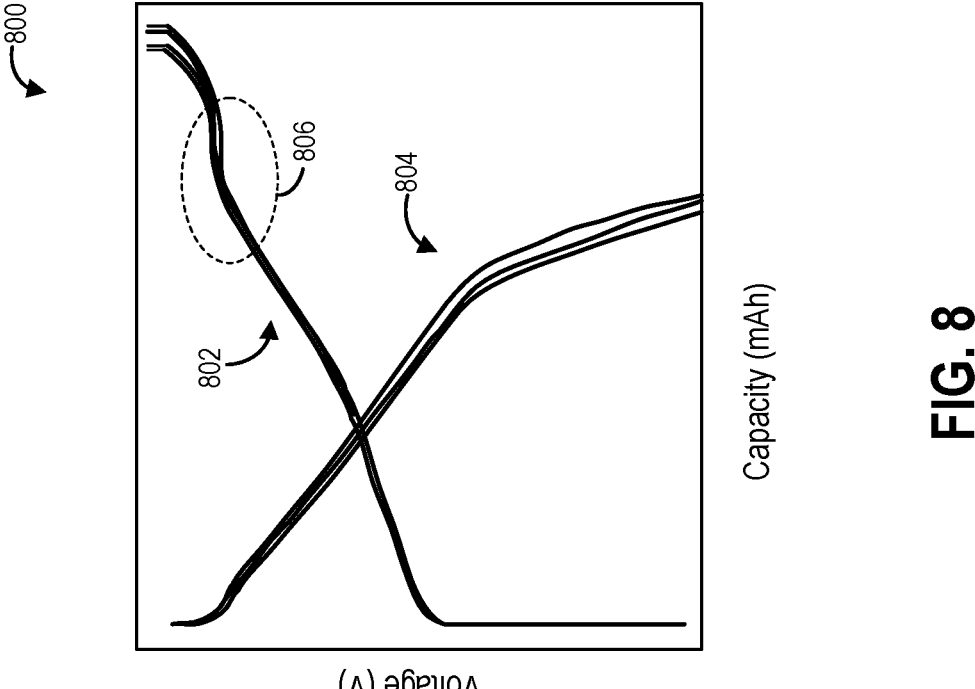
FIG. 8 shows a first graph plotting a voltage profile of a Li-ion battery formed of cells without the passivation layer.

The following description relates to systems and methods for a lithium-ion battery cell. By adding one of more electrolyte additives to the lithium-ion battery cell before an initial charge/discharge cycle is conducted, a passivation layer may be formed over chemical components of a pre-lithiated cathode of the lithium-ion battery cell, as illustrated in FIG. 1. Examples of a structure of the pre-lithiated cathode prior to formation of the passivation layer, e.g., prior to passivation, are shown in schematic diagrams in FIGS. 2A and 2B, and corresponding examples of the pre-lithiated cathode structures after passivation are depicted in FIGS. 3A and 3B. The passivation may occur at an electrode level, thereby coating surfaces of the pre-lithiated cathode, as well as at a particle level, thereby coating surfaces of the pre-lithiated cathode constituent particles, as shown in FIG. 4. The passivation layer may be formed of the one or more electrolyte additives which may be added to the battery cell electrolyte and oxidized during the initial charge cycle to coat constituents of the pre-lithiated cathode prone to facilitating parasitic reactions. An example of a method for forming a passivated, pre-lithiated cathode structure is depicted in FIG. 5. Two different strategies for forming the passivation layer are shown in FIGS. 6 and 7. An effectiveness of the one or more electrolyte additives in deactivating non-decomposed (e.g., intact and/or residual) pre-lithiation reagents is illustrated in a comparison of a voltage profile of a lithium-ion battery cell without the passivation layer, as shown in FIG. 8, and a voltage profile of a lithium-ion battery cell with the passivation layer, as shown in FIG. 9.

One or more electrolyte additives may be added to an electrolyte of a lithium (Li)-ion battery cell to passivate residual cathode constituents that do not decompose subsequent to a formation cycle, e.g., activation cycle of charge/discharge, of a lithium-ion battery cell. The constituents of the cathode may include various species, described in further detail below, which are represented as a particle in FIG. 1 in a diagram showing a process 10 for forming a passivation layer. It will be appreciated that the process 10 is a simplified, illustrative depiction of the process 10 showing where the passivation layer is formed. For example, the cathode may be formed of a plurality of constituents, each type of constituents incorporated into a crystal structure or lattice of the cathode. As such, the various types of constituents are represented as a single particle 12, which may be any of the plurality of constituents of the cathode. Furthermore, the cathode includes numerous particles of each constituent type, which may be arranged or positioned relative to one another according to the crystal structure of the cathode.

The various species, as represented by particle 12, may include one or more of a pre-lithiation reagent, a conductive additive, a catalyst, and an active material of the cathode. Specific examples of the pre-lithiation reagent, the catalyst, and the active material are provided herein. The conductive filler or additive may be a carbon-based material included in a mixture forming the cathode, e.g., mixed with the active material, and/or included in a mixture forming the prelithiation reagent, as indicated at arrow 14, an electrolyte additive 16 may be injected into an electrolyte of the lithium-ion battery cell, thereby dispersed into the electrolyte and able to surround the particle 12.

The electrolyte additive 16 may remain mixed into the electrolyte until a formation cycle of the lithium-ion battery cell is conducted, as indicated by arrows 18. The electrolyte additive 16 may also remain mixed into the electrolyte during the formation cycle of the lithium-ion battery cell. The formation cycle may be an initial charge/discharge cycling of the battery cell performed before the lithium-ion battery cell is made commercially available. Battery cell charging during the formation cycle promotes oxidation of the electrolyte additive 16, which leads to formation of a passivation layer at a surface of the particle 12, where the passivation layer is formed from the electrolyte additive 16 and the particle 12 becomes a passivated particle.

The passivation layer of the passivated particle 12 may vary in coverage and thickness. For example, a first exemplary passivation layer 20a may entirely coat the surface of the particle 12, forming a continuous and relatively uniform layer. As another example, a second exemplary passivation layer 20b may have a greater thickness than the first exemplary passivation layer 20a. A third exemplary passivation layer 20c may have a variable thickness and may coat portions of the surface of the particle 12, e.g., the third exemplary passivation layer 20c is not continuous and partially coats the particle 12. As illustrated in FIG. 1, the passivation layer may form with different physical attributes, such as thickness, evenness, and surface area coverage, but may have a similar effect of passivating constituent particles of the cathode, regardless of variations in physical attributes.

The thickness and coverage of the passivation layer may vary depending on parameters such as a concentration of the electrolyte additive in the electrolyte, a duration/rate of the charging cycle, and an interaction of the electrolyte additive with the cathode constituent according to chemical properties of the constituent. For example, the thickness of the passivation layer may be in a range of 0.1 nm to 20 nm. When the electrolyte additive is selected to provide an optimal capacity for passivating target constituents, such as the pre-lithiation reagent, the conductive additive, the catalyst, and the active material, the passivation layer may have a reduced thickness of less than 10 nm while providing effective passivation. In some examples, the thickness of the passivation layer may be maintained less than 5 nm.

Additionally, the thickness of the passivation layer may be different depending on the constituent. For example, the thickness may be greater or less at the catalyst compared to the pre-lithiation reagent. Furthermore, as shown by the third exemplary passivation layer 20c of FIG. 1, the passivation layer may cover less than a total surface area of the constituent particles (and cathode surfaces). For example, the passivation layer may coat 50% or more but less than 100% of the surface areas of the constituent particles, e.g., the particles are partially coated. In other words, the passivation layer forms a partial coating. In another example, the passivation layer may form a continuous coating, as shown by the first and second exemplary passivation layers 20a, 20b of FIG. 2, that covers an entire surface area of each of the constituent particles, e.g., the particles are completely (100%) coated. In other words, the passivation is a complete coating. In yet another example, some of the constituent particles may be partially coated and some of the constituent particles may be completely coated. The passivation layer may have a mass of 0.01% to 5% of a mass of the Li-ion battery cell chemical components (e.g., excluding an outer housing and hardware/structural components).

When the passivation layer is formed on surfaces of the pre-lithiation reagent particles from the electrolyte additive, the passivation layer may inhibit further decomposition of the pre-lithiation reagent particles remaining after the formation cycle. The further decomposition may be inhibited by formation of an electrochemical and physical barrier between the pre-lithiation reagent particles and the electrolyte. Inhibiting the further decomposition of the pre-lithiation reagent particles, may mitigate gassing issues, e.g., formation of gases due to the decomposition. Similarly, formation of the passivation layer over surfaces of the catalyst particles remaining after the formation cycle, as well as over surfaces of the conductive additive particles and the active material particles, may avert further electrolyte oxidation at the surfaces, which may also mitigate the gassing issues. In addition, the passivation layer may suppress increases in battery cell impedance due to excessive electrolyte oxidation. At the active material particle surfaces, the passivation layer may further mitigate surface restructuring of the active material particles and alleviate corresponding impedance growth.

A composition of the passivation layer may depend on a type of the electrolyte additive used and also on a type of particles over which the passivation layer forms. The type of electrolyte additive may be selected, for example, based on elements present in the electrolyte. As an example, the electrolyte may incorporate one or more of Li, C, O, F, B, amongst others, and the electrolyte additive species may be chosen to be compatible with the elements of the electrolyte, e.g., the electrolyte additive may be chosen such that the resulting passivation layer does not react with the electrolyte. As specific elements included in the electrolyte additive may be incorporated into the passivation layer, an electrolyte additive with target elements may be selected to correspond to elements present in the electrolyte. For example, if lithium difluorobis(oxalate)phosphate (LiDFOP) is chosen as the electrolyte additive, the passivation layer may include F and/or P.

Various techniques for incorporating additional Li into a cathode to form a pre-lithiated cathode are available, such as incorporation via direct slurry mixing where a pre-lithiation reagent is mixed into a cathode slurry, electrode-level pre-lithiation where a pre-lithiation coating is formed over surfaces of the cathode, and particle-level pre-lithiation where particles of cathode active material are coated with the pre-lithiation coating. Regardless of the pre-lithiation technique, passivation of the cathode constituents may be enabled via a common passivation process. The passivation process may be activated by conducting a first formation cycle of a battery cell which, as described above, causes oxidation of the electrolyte additive and binding of the electrolyte additive to surfaces of the cathode constituents as the passivation layer. As such, the passivation layer may form over all surfaces and constituent particles of the cathode, as shown below, with reference to FIGS. 3A-4.

Figure 2A:
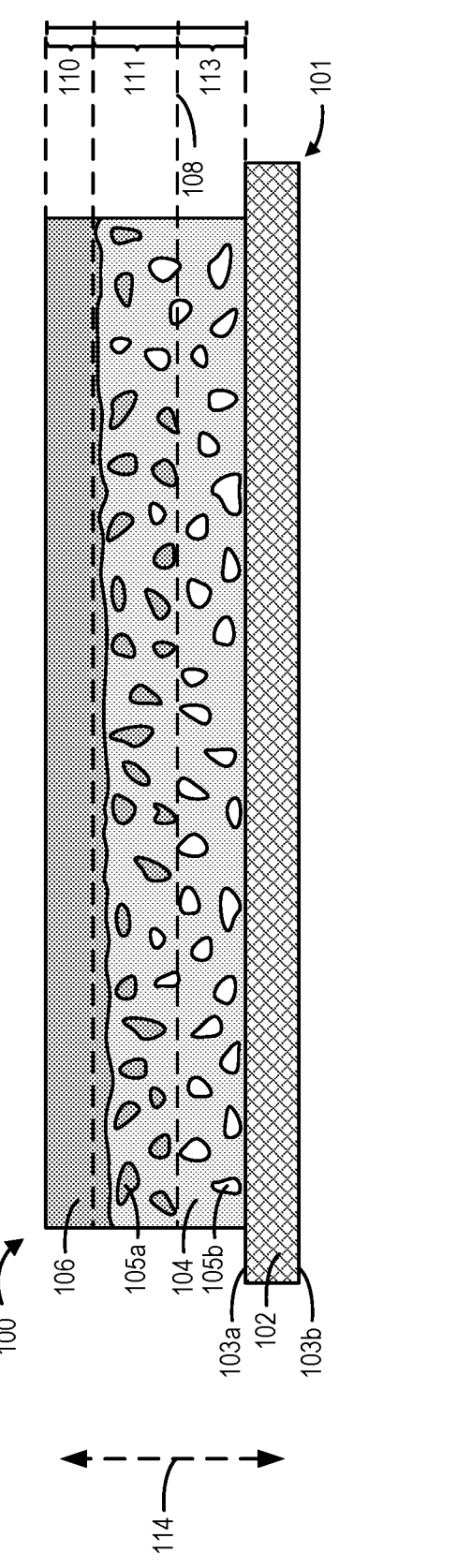
FIG. 2A shows a first example of a coated pre-lithiated electrode for a Li-ion battery cell.
Figure 2B:
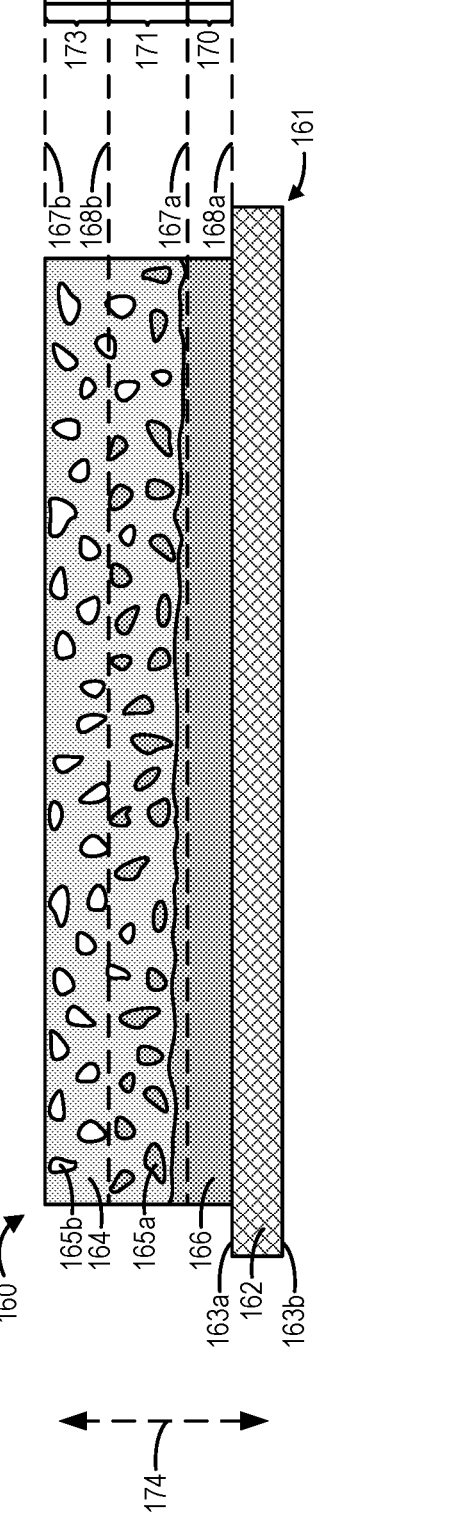
FIG. 2B shows a second example of a coated pre-lithiated electrode for the Li-ion battery cell.
Figure 3A:
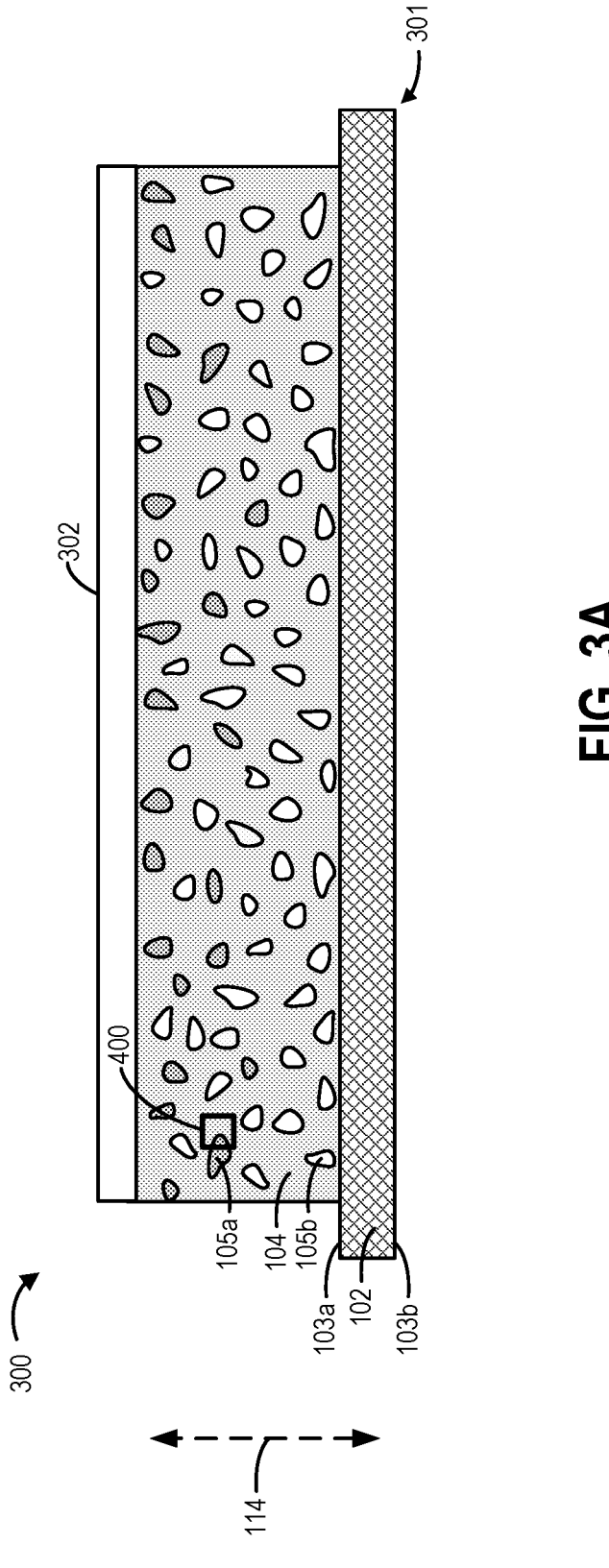
FIG. 3A shows an example of the electrode of FIG. 2A with a passivation layer formed of at least one electrolyte additive.
Figure 3B:
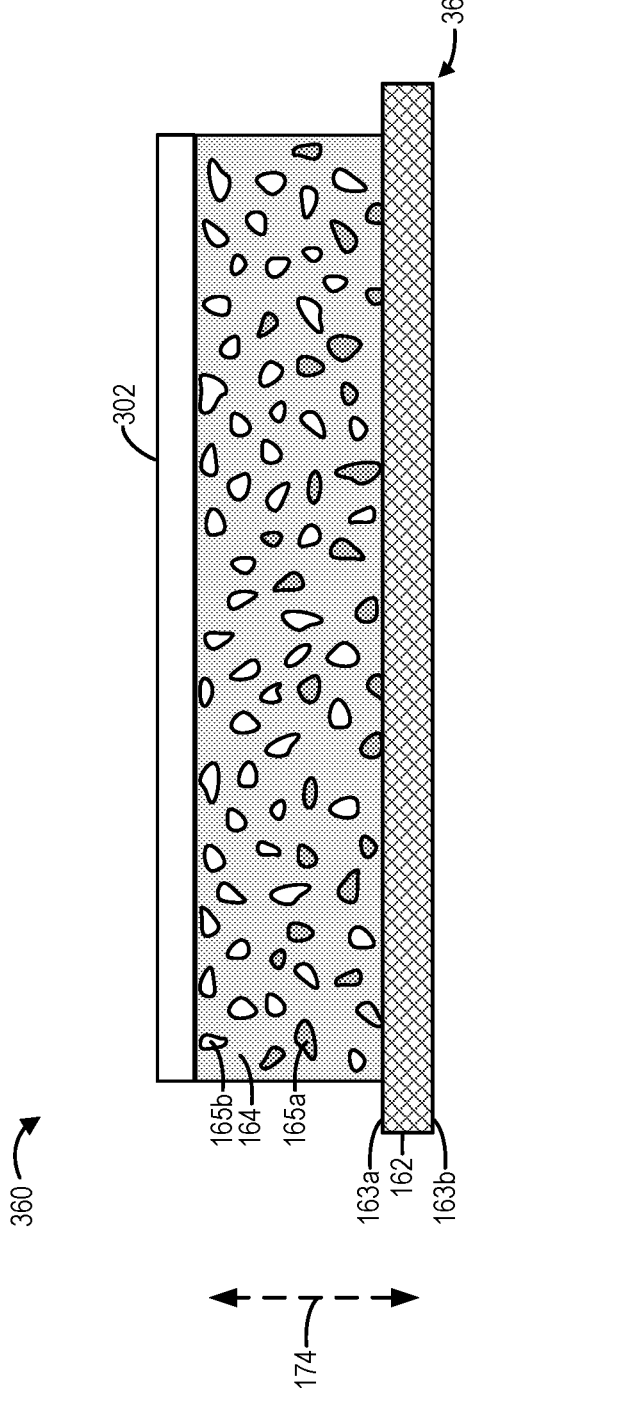
FIG. 3B shows an example of the electrode of FIG. 2B with a passivation layer formed of at least one electrolyte additive.

Examples of cathode structures, and passivation layers formed at the cathode structures, of a lithium-ion battery cell are shown in FIGS. 2A-3B at an electrode-level, e.g., an electrode scale. For example, the passivation layer is shown in FIGS. 3A and 3B as a coating over surfaces of a cathode structure, where the cathode structure is depicted in FIGS. 2A and 2B, prior to completion of a formation cycle. The electrode-level passivation layer may be formed as described above, with reference to FIG. 1, after the formation cycle is performed. A detailed view of a composition of the passivated cathode structure of FIG. 3A, which may similarly represent a composition of the passivated cathode structure of FIG. 3B, is shown in FIG. 4, illustrating formation of the passivation level at a particle-level, e.g., on a scale of particles of the cathode structure material.

Referring now to FIG. 2A, a first schematic cross-section 100 illustrating a first exemplary coated cathode structure 101 for use in a lithium-ion battery cell is shown. Upon formation, the coated cathode structure 101 may be positioned in the lithium-ion battery cell such that the coated cathode structure 101 may provide power to the lithium-ion battery cell. In some examples, the lithium-ion battery cell may be one of a plurality of lithium-ion battery cells in a lithium-ion battery cell pack, where each of the plurality of lithium-ion battery cells may have a substantially similar configuration to one another.

The coated cathode structure 101 may include a cathode current collector 102 having a first side 103a and a second side 103b, where the sides 103a, 103b may be opposite to one another with respect to an axis 114 parallel to a smallest dimension of the cathode current collector 102. The cathode current collector 102 may have a cathode active material layer 104 disposed or coated on one of the sides 103a, 103b, the cathode active material layer 104 being in face-sharing contact with the cathode current collector 102. Further, a cathode pre-lithiation layer 106 may be disposed or coated on the cathode active material layer 104 opposite to the cathode current collector 102 with respect to the axis 114 (e.g., opposite to the side 103a or 103b of the cathode current collector 102 on which the cathode active material layer 104 is coated, such that the cathode active material layer 104 is interposed between the cathode current collector 102 and the cathode pre-lithiation layer 106). For example, the cathode active material layer 104 may be coated on the first side 103a of the cathode current collector 102, such that the coated cathode structure 101 may include the cathode current collector 102, the cathode active material layer 104, and the cathode pre-lithiation layer 106 in sequence along the axis 114. Each of the sides 103a, 103b of the cathode current collector 102 may include cathode active material layers 104 respectively disposed thereon, with one or both of the cathode active material layers 104 including cathode pre-lithiation layer(s) 106 respectively disposed thereon opposite to the cathode current collector 102 (e.g., the coated cathode structure 101 may include the cathode pre-lithiation layer 106, the cathode active material layer 104, the cathode current collector 102, another cathode active material layer 104, and another cathode pre-lithiation layer 106 in sequence along the axis 114).

The cathode current collector 102 may be a metal sheet or foil such as Cu foil, Ni foil, Al foil, etc., or any other configuration which may conduct electricity and permit current flow therethrough. In one example, a thickness of the cathode current collector 102 may be between 1-20 μm (e.g., about 10 μm). However, it will be appreciated that the thickness of the cathode current collector 102 may vary widely, for example, up to 50 μm. As used herein, "about" when referring to a numerical value may encompass a deviation of 5% or less.

The cathode active material layer 104 may be a slurry-based layer composed of at least a cathode active material, a first conductive additive, and a first binder. In some examples, the cathode active material may be a lithium insertion/deinsertion material. For example, the lithium insertion/deinsertion material may include one or more of a lithium nickel manganese cobalt oxide (NMC), a lithium iron phosphate (LFP), a lithium manganese iron phosphate (LMFP), a lithium nickel cobalt aluminum oxide (NCA), a lithium cobalt oxide (LCO), a lithium cobalt phosphate (LCP), a lithium nickel phosphate (LNP), and a lithium manganese phosphate (LMP), and/or any number of other lithium insertion/deinsertion materials known to those of ordinary skill in the art. In an additional or alternative example, the cathode active material may be a lithium mixed metal oxide layered structured material. In some examples, the first conductive additive may be carbonaceous. For example, the first conductive additive may include carbon black, graphene, graphene oxide, and/or CNTs. In some examples, the first binder may include one or more polymers. For example, the first binder may include one or more of PVDF, polyvinylpyrrolidone, poly(ethylene) oxide (PEO) or cross-linked PEO, PTFE, PMMA, PAA, poly(vinylidene fluoride-co-hexafluoropropylene) (PVDF-HFP), one or more conductive polymers such as poly(3,4-ethylenedioxythiophene) (PEDOT), PEDOT polystyrene sulfonate (PEDOT:PSS), and the like, a cellulosic derivative, and a linear, semi-aromatic, or aromatic polyimide (PI).

As another example, the cathode pre-lithiation layer 106 may be a slurry-based layer composed of at least a cathode pre-lithiation reagent. In some examples, the cathode pre-lithiation reagent may include a lithium compound which may decompose to release Li+ ions during pre-lithiation of an anode of the lithium-ion battery cell (e.g., prior to or during initial charging of the lithium-ion battery cell). For example, the cathode pre-lithiation reagent may include one or more of $Li_3N$, $Li_2O$, $Li_2O_2$, $Li_2S$, $Li_5FeO_4$, a $Li_2S/M$ nanocomposite, a LiF/M nanocomposite, and a $Li_2O/M$ nanocomposite, where M is one or more metals.

The cathode pre-lithiation reagent may be formed as particulates of a core material having a surface impurity layer formed thereon. For example, the core material may include one or more of $Li_2O_2$, $Li_2O$, and $Li_2S$ and the surface impurity layer may include one or more of LiOH and $Li_2CO_3$. In some examples, the surface impurity layer may be formed (e.g., actively or intentionally formed, rather than formed as an undesired byproduct) during preparation of a slurry for forming the cathode pre-lithiation layer 106 via exposure of the core material to moisture and/or a $CO_2$-containing atmosphere. In additional or alternative examples, the surface impurity layer may function as an additional (e.g., secondary) cathode pre-lithiation reagent which may decompose to release Li+ ions during pre-lithiation of the anode of the lithium-ion battery cell. In such examples, the surface impurity layer may decompose within a voltage window, optionally with a catalyst, such as the cathode catalyst discussed below.

In addition, the cathode pre-lithiation layer 106 may further include a cathode catalyst, as shown in FIG. 4. In some examples, the cathode catalyst may catalyze decomposition of the cathode pre-lithiation reagent during pre-lithiation of the anode of the lithium-ion battery cell. For example, the cathode catalyst may include an inactive cathode catalyst composed of one or more non-lithiated metal oxides or non-lithiated metal phosphates and/or an active cathode catalyst composed of one or more lithium metal oxides or lithium metal phosphates. Another example of the cathode catalyst includes NMC. In other examples, the cathode pre-lithiation reagent may decompose during practical battery cell operation voltage windows absent the cathode catalyst.

In some examples, the cathode pre-lithiation layer 106 may further include a second binder. In some examples, the second binder may bind particles of the cathode pre-lithiation reagent to one another, to other particles of the cathode pre-lithiation layer 106, and/or to surfaces of the cathode active material layer 104. For example, the second binder may include one or more of polyacrylonitrile (PAN), polyethylene glycol (PEG), polyvinylidene fluoride (PVDF), polytetrafluoroethylene (PTFE), polyhexafluoropropylene (PHFP), poly (methyl methacrylate) (PMMA), polyacrylic acid (PAA), poly(4-vinylpyridine), polyvinylpyrrolidone, a Carboxymethyl cellulose (CMC) derivative, or a copolymer thereof. In other examples, the cathode pre-lithiation layer 106 may sufficiently adhere to the cathode active material layer 104 absent the second binder.

In some examples, the cathode pre-lithiation layer 106 may further include a second conductive additive. In some examples, the second conductive additive may include a carbonaceous material which increases an electronic conductivity of the lithium-ion battery cell. For example, the second conductive additive may include one or more of carbon black, carbon fibers, carbon nanoparticles, CNTs, graphene oxide, and graphene. In some examples, an amount of the first conductive additive in the cathode active material layer 104 may be reduced or eliminated due to the presence of the second conductive additive in the cathode pre-lithiation layer 106 (which may serve a similar purpose in the lithium-ion battery cell).

In some examples, the first and second binders may have the same composition (as dependent on compatibility of the first binder with the cathode active material and the second binder with the cathode pre-lithiation reagent). In other examples, the first and second binders may have differing compositions (again, as dependent on compatibility of the first binder with the cathode active material and the second binder with the cathode pre-lithiation reagent). Similarly, in some examples, the first and second conductive additives may have the same composition, while in other examples, the first and second conductive additives may have differing compositions.

In some examples, the cathode pre-lithiation layer 106 may include a non-negligible amount of a secondary cathode active material (e.g., NMC) which may be the same as or different from the cathode active material of the cathode active material layer 104. In one example, the secondary cathode active material may be included in the cathode pre-lithiation layer 106 as the (active) cathode catalyst.

Respective slurries forming the cathode active material layer 104 and the cathode pre-lithiation layer 106 may be separately prepared and cast in sequence. Specifically, the cathode active material layer 104 may be formed from a first slurry cast onto the cathode current collector 102 and the cathode pre-lithiation layer 106 may be formed from a second slurry cast onto the cathode active material layer 104, the second slurry being separate and independent, and having a different composition, from the first slurry. In this way, the cathode active material layer 104 and the cathode pre-lithiation layer 106 may be formed as separate slurry-based coatings.

In some examples, the cathode active material layer 104 may include a plurality of pores. The plurality of pores may conform to a number of shapes and sizes. As an example, the plurality of pores may independently have defined shapes, such as circular (e.g., spherical), elliptical (e.g., spheroidal), or irregular, in any combination thereof among the plurality of pores. Accordingly, when a slurry having sufficiently low viscosity and particles of sufficiently small scale is coated on the cathode active material layer 104, the slurry may seep into or infiltrate those pores nearest a coating interface of the slurry with the cathode active material layer 104 (e.g., where the slurry initially contacts the cathode active material layer

104), thereby improving layer-to-layer adhesion of the cathode active material layer 104 and the (finally-formed) cathode pre-lithiation layer 106 as compared to a relatively high viscosity slurry and/or a relatively low porosity cathode active material layer. During subsequent drying and calendering of the slurry, the slurry may reach a maximum infiltration depth and may cease infiltrating the plurality of pores of the cathode active material layer 104.

Specifically, and as shown, a portion of the cathode pre-lithiation layer 106 may infiltrate the plurality of pores of the cathode active material layer 104 up to a maximum infiltration depth 111. Accordingly, the plurality of pores may include a plurality of filled pores 105a and a plurality of vacant pores 105b, the plurality of filled pores 105a being filled with the infiltrating portion of the cathode pre-lithiation layer 106. Correspondingly, a remaining portion of the cathode pre-lithiation layer 106 not infiltrating the plurality of pores of the cathode active material layer 104 may extend away from the cathode active material layer 104 along the axis 114 up to a maximum extent 110. Further, a remaining portion of the cathode active material layer 104 not infiltrated by the cathode pre-lithiation layer 106 (e.g., including the plurality of vacant pores 105b) may extend away from the cathode pre-lithiation layer 106 along the axis 114 up to a maximum extent 113. In some examples, the maximum extent 113 may be greater than the maximum extent 110.

In some examples, the cathode pre-lithiation layer 106 may infiltrate each of the plurality of pores interposed between the bulk of the cathode pre-lithiation layer 106 and a lower extent 108 and may therefore be evenly distributed throughout the plurality of pores up to the maximum infiltration depth 111. However, in other examples, and as shown, at least some of the plurality of vacant pores 105b may remain between the bulk of the cathode pre-lithiation layer 106 and the lower extent 108. Accordingly, in such examples, the cathode pre-lithiation layer 106 may not be evenly distributed among the plurality of pores interposed between the bulk of the cathode pre-lithiation layer 106 and the lower extent 108.

Referring now to FIG. 2B, a schematic cross-section 160 illustrating another exemplary coated cathode structure 161 for use in a lithium-ion battery is shown. The coated cathode structure 161 may incorporate materials and components as described above with reference to FIG. 2A. Upon formation, the coated cathode structure 161 may be positioned in the lithium-ion battery such that the coated cathode structure 161 may provide power to the lithium-ion battery. In some examples, the lithium-ion battery may be one of a plurality of lithium-ion battery cells in a lithium-ion battery pack, where each of the plurality of lithium-ion battery cells may have a substantially similar configuration to one another.

Structural features of the coated cathode structure 161 may be considered substantially similar to, or the same as, the coated cathode structure 101 of FIG. 2A, excepting as discussed below. Specifically, the coated cathode structure 161 may include a cathode current collector 162 having a first side 163a opposite to a second side 163b with respect to an axis 174 parallel to a smallest dimension of the cathode current collector 162. The coated cathode structure 161 may further include a cathode active material layer 164 and a cathode pre-lithiation layer 166. The cathode active material layer 164 and the cathode pre-lithiation layer 166 may be formed as separate slurry-based coatings, with the cathode active material layer 164 including a plurality of pores, the plurality of pores including a plurality of filled pores 165a (infiltrated by the cathode pre-lithiation layer 166) and a plurality of vacant pores 165b. Accordingly, and as should be readily apparent, components of the coated cathode structure 161 may be similarly numbered to components of the coated cathode structure 101 of FIG. 2A (e.g., the cathode current collector 162, the cathode active material layer 164, the cathode pre-lithiation layer 166, etc. may be substantially similar to, or the same as, the cathode current collector 102, the cathode active material layer 104, the cathode pre-lithiation layer 106, etc., respectively, excepting as discussed below).

However, and in contrast to the coated cathode structure 101 of FIG. 2A, in the coated cathode structure 161, the cathode current collector 162 may have the cathode pre-lithiation layer 166 disposed or coated on one of the sides 163a, 163b, the cathode pre-lithiation layer 166 being in face-sharing contact with the cathode current collector 162. Accordingly, the cathode active material layer 164 may be disposed or coated on the cathode pre-lithiation layer 166 opposite to the cathode current collector 162 with respect to the axis 174 (e.g., opposite to the side(s) 163a and/or 163b of the cathode current collector 162 on which the cathode pre-lithiation layer 166 is coated, such that the cathode pre-lithiation layer 166 is interposed between the cathode current collector 162 and the cathode active material layer 164). For example, the cathode pre-lithiation layer 166 may be coated on the first side 163a of the cathode current collector 162, such that the coated cathode structure 161 may include the cathode current collector 162, the cathode pre-lithiation layer 166, and the cathode active material layer 164 in sequence along the axis 174. In other examples, each of the sides 163a, 163b of the cathode current collector 162 may include cathode pre-lithiation layers 166 respectively disposed thereon, with one or both of the cathode pre-lithiation layers 166 including cathode active material layer(s) 164 respectively disposed thereon opposite to the cathode current collector 162 (e.g., the coated cathode structure 161 may include the cathode active material layer 164, the cathode pre-lithiation layer 166, the cathode current collector 162, another cathode pre-lithiation layer 166, and another cathode active material layer 164 in sequence along the axis 174).

An infiltrating portion of the cathode pre-lithiation layer 166 may infiltrate the cathode active material layer 164 to a maximum infiltration depth 171 (e.g., from a lower surface or extent 167a of the cathode active material layer 164 to an upper surface or extent 168b of the cathode pre-lithiation layer 166) and a remaining portion of the cathode pre-lithiation layer 166 may extend away from the cathode active material layer 164 along the axis 174 to a maximum extent 170 (e.g., from the lower surface or extent 167a of the cathode active material layer 164 to a lower surface or extent 168a of the cathode pre-lithiation layer 166). Further, a portion of the cathode active material layer 164 not being infiltrated by the cathode pre-lithiation layer 166 may extend away from the cathode pre-lithiation layer 166 along the axis 174 to a maximum extent 173 (e.g., from the upper surface or extent 168b of the cathode pre-lithiation layer 166 to an upper surface or extent 167b of the cathode active material layer 164).

It will be appreciated that the aspects of the coated cathode structures 101 and 161 described in detail above with reference to FIGS. 2A-2B are not mutually exclusive and that such aspects may be added, removed, substituted, or combined according to a given application. Furthermore, the depicted coated cathode structures are non-limiting example of how a coated cathode structure may be configured. For example, a coated cathode structure may include a cathode current collector coated on opposite sides thereof with differing coating configurations (e.g., maximum infiltration depths, maximum extents, overall thicknesses, and/or relative layer orderings of cathode active material and cathode pre-lithiation layers may differ between the coated sides of the cathode current collector). Furthermore, other methods for incorporating the pre-lithiation reagents into the cathode are possible. For example, pre-lithiation of the cathode may be accomplished by electrochemical pre-lithiation or three-electrode anode in-situ pre-lithiation. Regardless of pre-lithiation technique, application of an electrolyte additive to deactivate non-decomposed pre-lithiation reagents may enhance electrochemical performance of the battery cell.

As described above, a pre-lithiation layer may be formed on a cathode from a pre-lithiation reagent (where the pre-lithiation reagent includes one or more species) to provide extra $Li^+$ to the cathode active material. The $Li^+$ may be provided to the cathode before or during first charge/discharge of a Li-ion battery cell (e.g., a formation cycle) and the pre-lithiation reagent may decompose to products during the formation cycle that do not interfere with an electrochemical performance of the cathode. In some instances, one or more catalysts may be included at the cathode to expedite the decomposition of the pre-lithiation reagent.

In some examples, particularly when a Li-ion battery cell is scaled up in size, the pre-lithiation reagent may not fully decompose after the formation cycle. Thus, a residual, non-decomposed portion may remain at the cathode, which may proceed to decompose during subsequent battery cell operation, leading to undesirable generation of gas, such as oxygen ($O_2$) and/or nitrogen ($N_2$). During instances where the one or more catalysts are added to catalyze pre-lithiation reagent decomposition, a presence of the catalysts in the battery cell during cycling may also result in gas generation as well as electrolyte oxidation side reactions.

As such, deactivation of both the residual pre-lithiation reagent and the corresponding catalysts may inhibit release of gas from the cathode and mitigate adverse effects on battery cell stability. Deactivation of the pre-lithiation reagent and catalysts may be achieved by incorporation of an electrolyte additive, as shown in FIG. 1, configured to form a passivation layer on the cathode and, more specifically, on the pre-lithiation reagent and catalysts, as well as other cathode constituents. The electrolyte additive may be one or more of a borate, sultone, fluorinate, anhydride, a phosphorous-based compound, cyano compound, unsaturated alkyl compound, and a blend thereof. Furthermore, in some examples, the electrolyte additive may be a lithium salt of one of the aforementioned groups. For example, the electrolyte additive may be one or more of lithium bis (oxolato)borate (LiBOB), lithium 4-pyridyl trimethyl borate (LPTB), lithium tetrafluoroborate ($LiBF_4$), lithium oxalyldifluoroborate (LiDFOB), diisopropylfluorophosphate (DFP), LiDFOP, lithium tetrafluorooxalatophosphate (LiTFOP), lithium 4,5-dicyano-2-(trifluoromethyl)imidazole (LiTDI), lithium hexafluorophosphate ($LiPF_6$), lithium di(trifluoromethanesulfonyl)imide (LiTFSI), lithium di(fluorosulfonyl)imide (LiFSI), and any blends thereof.

In one example, the electrolyte additive may be used conventionally for reducing corrosion at an aluminum current collector of a Li-ion battery cell, stabilizing an electrolyte of the battery cell, and/or forming a coating at an anode of the battery cell to support the anode structure. However, as described herein, the electrolyte additive may instead be used to coat the pre-lithiation reagent, catalysts, and various other materials on the cathode that may facilitate gas formation in the battery cell.

For example, a schematic cross-section 300 of FIG. 3A illustrates an exemplary passivated cathode structure 301 for use in a lithium-ion battery cell. The passivated cathode structure 301 of FIG. 3A includes some of the components of the coated cathode structure 101 of FIG. 2A. However, at least a portion of the pre-lithiation layer 106 shown in FIG. 2A decomposes during the formation cycle and a remaining portion of the pre-lithiation layer is shown as filled pores 105a proximate to an upper surface (e.g., distal to the cathode current collector 162 along the axis 114) of the passivated cathode structure 301. The passivated cathode structure 301 further includes a passivation layer 302 formed of an electrolyte additive, such as the electrolyte additives described above. While the passivation layer 302 is shown as a continuous layer completely coating the upper surface of the passivated cathode structure 301, in other examples, the passivation layer 302 may not be a continuous layer and may instead coat a portion or portions of the upper surface of the passivated cathode structure 301.

Similarly, a schematic cross-section 360 of FIG. 3B shows another passivated cathode structure 361 after conducting a formation cycle, which includes components of the coated cathode structure 161 of FIG. 2B. At least a portion of the pre-lithiation layer 166 shown in FIG. 2B decomposes but some of a pre-lithiation reagent of the pre-lithiation layer remains, depicted as the plurality of filled pores 165a proximate to a bottom of the passivated cathode structure 361 (e.g., proximate to the cathode current collector 162 along the axis 174). The passivated cathode structure 361 also includes the passivation layer 302 formed of the electrolyte additive, the passivation layer 302 located at an upper surface of the passivated cathode structure 361. The electrolyte additive may be added to an electrolyte of the battery cell and, during the formation cycle, may be oxidized to form the passivation layer 302. Addition of the electrolyte additive may occur before or after a formation cycle of the battery cell, as described further below with reference to FIGS. 6 and 7.

Particle-level passivation is also enabled by the process 10 shown in FIG. 1. At the particle-level, constituent particles forming the cathode structure, e.g., the passivated cathode structures 301, 361 of FIGS. 3A and 3B, may be passivated with a passivation layer formed from the electrolyte additive. For example, as shown in FIG. 4, a particle-level view 400 of the passivated cathode structure of FIG. 3A is shown, as indicated by a box in FIG. 3A.

The particle-level view 400 depicts cathode active material particles 402, which may form the cathode active material layer 104 of FIG. 3A, with each of the cathode active material particles 402 surrounded by a passivation layer 404. The passivated cathode structure includes conductive additive particles 406, which may be carbon-based materials as described above. The conductive additive particles 406 may also include the passivation layer 404 coating each of the conductive additive particles 406.

Pre-lithiation reagent particles 408 may remain in the passivated cathode structure after the formation cycle and may be similarly coated with the passivation layer 404, which also coats catalyst particles 410, which are incorporated to aid decomposition of the pre-lithiation reagent particles 408. As described above with respect to FIG. 3A, although the passivation layers 404 shown in FIG. 4 are depicted as continuous, complete layers circumferentially surrounding each of the particles, in other examples, the passivation layers 404 may provide partial coverage of a surface area of each the particles, e.g., less than 100% of the surface area. Furthermore, the passivation layers 404 depicted in FIG. 4 are non-limiting examples, and relative thicknesses of the passivation layers, as well as relative sizes, shapes, and positioning of the different particle types, may vary from the illustrative examples of FIG. 4.

Additionally, the electrode-level and particle-level passivation shown in FIGS. 3A-4 may occur for different pre-lithiation processes and modes. For example, the formation of passivation layers over the constituent particles of the cathode structure, as well as over surfaces of the cathode structure, may be observed for pre-lithiation processes other than fabrication of a coated cathode structured with an infiltrated pre-lithiation layer, as illustrated in FIGS. 2A and 2B. For example, pre-lithiation of cathodes at a particle-level, e.g., formation of pre-lithiation layers over active cathode material particles, as well as direct slurry incorporation of a pre-lithiation reagent, may also result in analogous passivation of the cathode structure to that shown in FIGS.

The passivation layer may be a uniform layer over surfaces of the cathode that remains stable during battery cell cycling and provides electronic insulation. In addition, the passivation layer may coat each particle of the cathode constituents, including particles of the pre-lithiation reagent remaining after the formation cycle, as illustrated in FIG. 4. A type (or types) of the electrolyte additive forming the passivation layer, as well as an amount of the electrolyte additive(s), may be selected to produce the passivation layer without altering properties of the bulk electrolyte and without adversely affecting an additional charge capacity attributed to pre-lithiation of the cathode or decreasing a cycling performance of the battery cell. For example, the chemical and/or physical properties of the electrolyte additive may increase the cycling performance of the battery cell by suppressing parasitic reactions. It will be noted that hereafter, reference to the electrolyte additive includes use of one or more electrolyte additives concurrently where the electrolyte additive includes one or more lithium salts as well as other additives, such as a conductive, carbon-based additive, for example.

For example, the electrolyte additive may inhibit impedance growth as well as gas production in the battery cell. Impedance may increase due to loss of electrolyte resulting from solid electrolyte interphase (SEI) formation, high voltage operation, elevated temperatures, moisture contamination, etc. By forming the passivation layer, electrolyte-related reactions at the cathode may be suppressed and impedance may be maintained low or at least uniform.

Gas generation by the pre-lithiation reagents and catalysts at the cathode may be mitigated by a barrier imposed between the cathode surfaces and the electrolyte by the passivation layer. The electrolyte additive may oxidize on the surface of the prelithiation additives/catalyst/carbon additives to form layers via electrochemical or electrocatalytic reactions. Such layers may be dense and/or insulating, adding a physical and/or electrochemical barrier to the decomposition of pre-lithiation additives, thus impeding gas generation. For example, the passivation layer formed from the electrolyte additive may be a layer between the cathode and the electrolyte that forms 0.01% to 5% of an overall mass of a battery cell (excluding outer components, such as a housing).

The type and amount of the electrolyte additive may be chosen such that a decomposition potential of the pre-lithiation reagent does not increase to a non-realistic potential for Li-ion batteries, which may compromise an additional capacity enabled by cathode pre-lithiation. As well, selection of the electrolyte additive may affect an interface impedance between the electrolyte and the cathode active material. For example, an unsuitable electrolyte additive or amount of electrolyte additive may cause the interface impedance to increase, which may degrade cell cycle performance, power performance, and exacerbate cell gassing. Thus, the electrolyte additive type may be selected to provide optimal results based on, as one example, a type of electrolyte used in a battery cell to ensure chemical compatibility between the electrolyte additive, resulting passivation layer, and the electrolyte. Elements present in the electrolyte, for example, may be considered when selecting the electrolyte additive.

To this end, the electrolyte additives, including, for example, LiBOB, LPTB, LiBF4, LiFOB, LiTFOP, $LiPF_6$, LiTFSI, LiDFOB, LiFSI, and any blends thereof, may provide the desired effects described above. Furthermore, the electrolyte additives may do so without compromising an additional capacity released by the pre-lithiation reagent or a cycling performance of the cathode. The electrolyte additive may provide additional benefits that improve the cycling performance of the cathode.

A content of the electrolyte additive, including combinations of electrolyte additives, in a Li-ion battery cell may be in a range of 0.01% to 10% of a mass of a bulk electrolyte. In another example, the electrolyte additive may be included in a range of 0.01% to 5%, or in a range of 0.01% to 3% of the bulk electrolyte mass. A thickness of the passivation layer formed by the electrolyte additive may vary depending on the mass percentage of the electrolyte additive and may be in a range of 0.1 nm to 100 nm in one example. As another example, as described above, the thickness of the passivation layer may be in a range of 0.1 nm to 20 nm. In other examples, the thickness of the passivation layer may be in a range of 0.1 nm to 50 nm, or 0.1 nm to 10 nm.

The electrolyte additive may be added to the bulk electrolyte with a lithium salt concentration of 0.5 M to 2.0 M. As another example, the electrolyte additive may have a lithium salt concentration of 0.8 M to 2.0 M, or 0.8 M to 1.5 M. The bulk electrolyte may include solvent which may include one or more of a carbonate and/or another type of solvent, such as ethylene carbonate (EC), dimethyl carbonate (DMC), diethyl carbonate (DEC), ethyl methyl carbonate (EMC), fluoroethylene carbonate (FEC), 2,5-furandimethylcarboxylate (FDMC), fluorinated diethyl carbonate (FDEC), carboxylic ester, fluorinated carboxylic ester, propyl propanoate (PP), ethyl propanoate (EP), propyl acetate (PA), ethyl acetate (EA). In one example, a mass percentage of the electrolyte components may be 10%-40% for EC, 20%-40% for DMC, 20%-40% for DEC, and 30%-50% for EMC.

Referring now to FIG. 5, an example of a method 500 is depicted for passivating a pre-lithiated cathode of a Li-ion battery cell to provide an electrochemical barrier inhibiting further decomposition of a pre-lithiation reagent used to provide additional lithium source to the anode, as well as to deactivate a catalyst used to aid decomposition of the pre-lithiation reagent. Specifically, at least a portion of the pre-lithiation reagent may decompose as the battery cell is cycled through a formation cycle. However, a residual portion of the pre-lithiation reagent may remain intact, e.g., non-decomposed, after the formation cycle. The passivation layer, formed from at least one electrolyte additive, may coat the residual pre-lithiation reagent when the electrolyte additive is oxidized during the formation cycle, thereby deactivating the pre-lithiation reagent and suppressing continued decomposition of the pre-lithiation reagent during subsequent battery cell cycling. It will be appreciated that method

500 may be described in relation to the components described in detail above with reference to FIGS. 2A-4. For example, the pre-lithiated cathode may have the coated cathode structure 101 and 161 of FIGS. 2A-2B. Further, though the embodiments described herein are directed to formation of pre-lithiated cathodes, it will be appreciated that at least some of the embodiments described herein may be adapted to an anode of the Li-ion battery cell. For example, method 500 may be readily adapted or altered to a slurry for fabricating a pre-lithiated anode with a passivation layer.

At 502, method 500 includes forming the pre-lithiated cathode. As one example, forming the pre-lithiated cathode may include forming a homogeneous mixture including a cathode pre-lithiation reagent which may be uniformly dispersed in a non-aqueous solvent. In some examples, the cathode pre-lithiation reagent may be selected from $Li_3N$, $Li_2O$, $Li_2O_2$, $Li_2S$, $Li_5FeO_4$, a $Li_2S/M$ nanocomposite, a LiF/M nanocomposite, a $Li_2O/M$ nanocomposite, or any combination of the preceding compounds, where M is one or more metals, and the non-aqueous solvent may be selected from DMF, NMP, DMAc, DMSO, MeCN, THF, toluene, or any combination of the preceding compounds. One or more additives may be uniformly dispersed in the non-aqueous solvent, the one or more additives including one or more of a cathode catalyst (e.g., for catalyzing decomposition of the cathode pre-lithiation reagent), a binder (e.g., for binding various components of the homogeneous mixture to one another), and a conductive carbon additive (e.g., for improving electronic conductivity of the lithium-ion battery). In some examples, the cathode catalyst may be selected from an inactive cathode catalyst composed of one or more non-lithiated metal oxides or non-lithiated metal phosphates and/or an active cathode catalyst composed of one or more lithium metal oxides or lithium metal phosphates.

Forming the pre-lithiated cathode may further include, in some examples, forming a slurry of the pre-lithiated cathode components and includes casting the slurry onto a cathode substrate to form a slurry-coated cathode substrate. Other techniques for incorporating the components into a cathode structure are possible, however. In one example, the cathode substrate may include a porous cathode active material layer disposed on a cathode current collector. In one example, the porous cathode active material layer may be formed by casting an additional, separate slurry onto the cathode current collector prior to casting the slurry onto the cathode substrate. The pre-lithiated cathode may then be dried and calendered.

At 504, method 500 includes adding an electrolyte to a vessel. For example, the electrolyte may be injected into a housing of the Li-ion battery cell. The electrolyte may be a mixture including one or more of a solvent, such as EC, DMC, DEC, and EMC, etc., as described above. The pre-lithiated cathode may be placed in the electrolyte at 506 such that the electrolyte is in contact with the pre-lithiated cathode. For example, the pre-lithiated cathode may be positioned in the Li-ion battery cell. At least a portion of an overall surface area of the pre-lithiated cathode may be in contact with the electrolyte. In one example, the pre-lithiated cathode may be fully submerged within the electrolyte.

At 508, method 500 includes forming the passivation layer over surfaces of the pre-lithiated cathode and over particles of the pre-lithiated cathode components, e.g., constituent particles including particles of the pre-lithiation reagent that remain non-decomposed after conducting the formation cycle of the battery cell. For example, an anode may be electrically coupled to the cathode which may be further coupled to a voltage source. To form the passivation layer, the electrolyte additive, which may be one or more of a borate, a sultone, a fluorinate, an anhydride, a phosphorous-based compound, a cyano compound, an unsaturated alkyl compound, and a blend thereof and may further be one or more of LiBOB LPTB, $LiBF_4$, LiFOB, LiTFOP, $LiPF_6$, LiTFSI, LiFSI, and a blend thereof, may be added to the electrolyte via two possible strategies. More specifically, the electrolyte additive may be added to the electrolyte at different points during a formation process of the passivation layer.

A first strategy includes, at 510, injecting the electrolyte additive before the formation cycle is conducted. In some examples, the electrolyte additive may be added to the electrolyte earlier in method 500, such as at 504. Details of the first strategy are elaborated below, with reference to FIG. 6. At 512, a second strategy for formation of the passivation layer includes injecting the electrolyte additive after the formation cycle is conducted. Details of the second strategy are described further below, with reference to FIG. 7.

Turning now to FIG. 6, method 600 shows a first formation process for the passivation, e.g., both electrode-level passivation and particle-level passivation, of the Li-ion battery cell cathode. At 602, the battery cell may be assembled (if assembly is not already completed during execution of method 500). For example, the pre-lithiated cathode may be formed as described in method 500 of FIG. 5, or another method for fabrication of the pre-lithiated cathode, and added to the battery cell, along with the anode, the electrolyte, and any other battery cell components. The battery cell components, including the cathode and anode, may be positioned in the battery cell and suitably coupled and/or secured in place with the electrolyte in contact with the cathode and the anode.

At least one electrolyte additive, where the electrolyte additive may be any of the electrolyte additive species described above, is injected into the electrolyte, e.g., bulk electrolyte, at 604 to disperse the electrolyte additive into the electrolyte of the battery cell and a formation cycle is conducted at 606 to activate the battery cell. In other examples, however, the electrolyte additive may be added to the electrolyte during assembly of the battery cell, such as at 602. The electrolyte additive may be selected to have a higher oxidation potential than a decomposition oxidation potential of the cathode pre-lithiation reagent (where the pre-lithiation reagents is formed of one or more species). Thus, during a charge cycle of the formation cycle, oxidation of the pre-lithiation reagents occurs before oxidation of the electrolyte additive and at least a portion of the pre-lithiation reagent (e.g., forming a pre-lithiation layer on the cathode) may decompose. Any remaining amount of the pre-lithiation reagent may be subsequently coated by an electrolyte additive layer or coating that forms as a result of electrolyte additive oxidation. The electrolyte additive coating also forms over the catalysts, thereby passivating both the pre-lithiation reagent and the catalysts. The method ends.

Turning now to FIG. 7, method 700 shows a second formation process for the passivation layer of the Li-ion battery cell cathode, e.g., electrode-level passivation and particle-level passivation. At 702, the battery cell may be assembled. As described above at 602 of method 600, the battery cell may be assembled (if assembly is not already complete) by adding a pre-lithiated cathode, an anode, an electrolyte, and other battery cell components to the battery cell.

A formation cycle, e.g., initial charge/discharge, of the battery cell is conducted at 704 to activate the battery cell.

During a charge cycle of the formation cycle, at least a portion of a pre-lithiation reagent, forming a pre-lithiation layer at the cathode, may decompose. However, a portion of the pre-lithiation regent may not decompose.

At least one electrolyte additive, where the electrolyte additive may be any of the electrolyte additive species described above, is injected into the bulk electrolyte at 706, after the formation cycle. In some examples, the electrolyte additive may have a lower oxidation potential than a decomposition oxidation potential of the pre-lithiation reagent and the electrolyte additive is therefore added after the formation cycle to allow decomposition of the pre-lithiation reagent to occur, which may otherwise be inhibited by oxidation of the electrolyte additive. However, in other examples, the electrolyte additive may have an oxidation potential similar to or lower than the decomposition oxidation potential of the pre-lithiation reagent. Any remaining portion of the pre-lithiation reagent may be coated by an electrolyte additive layer or coating that forms as a result of electrolyte additive oxidation. The electrolyte additive coating also forms over the catalysts, thereby passivating both the pre-lithiation reagent and the catalysts. The method ends.

In some instances, particularly during large scale production of Li-ion batteries, method 700 may be preferable over method 600 due to its applicability to electrolyte additives of a broad range of oxidation potentials, relative to the decomposition oxidation potential of the pre-lithiation reagent. By adding the electrolyte additives after the formation cycle, disruption to the decomposition of the pre-lithiation reagent is circumvented. Furthermore, in some examples, the electrolyte additive may be added during the formation cycle. For example, the charge cycle may be conducted and a charge capacity of the battery cell may be assessed. If the charge capacity does not meet a target, expected capacity, the electrolyte additive may be injected prior to initiation of the discharge cycle. In some examples, the electrolyte additive may be added to the battery cell upon determination that battery cell performance does not meet a desired performance level. However, in other examples, addition of the electrolyte additive may be included in the manufacturing process and added pre-emptively to counter possible, anticipated effects of the pre-lithiation reagent.

Incorporation of an electrolyte additive into a Li-ion battery cell may affect a cycling charge capacity of the battery cell during a formation cycle of the battery cell. For example, a comparison of a first charge capacity (FCC), a first discharge capacity (FDC), and a first cycle efficiency (FCE) of each of a first Li-ion battery cell without a passivation layer, the passivation layer formed of an electrolyte additive, and of a second Li-ion battery cell with a passivation layer is shown below in Table 1, where the electrolyte additive is LiDFOP. The first battery cell and the second battery cell may include similarly pre-lithiated cathodes.

TABLE 1

Effect of electrolyte additive on charge capacity of Li-ion battery cell

| Conditions | FCC (mAh/g) | FDC (mAh/g) | FCE (%) |
|---|---|---|---|
| 1) Without electrolyte additive | 267.6 | 196.1 | 73.3 |
| 2) With electrolyte additive | 224.5 | 203.3 | 90.6 |

The results summarized in Table 1 show that during the first charge cycle, the capacity of the first battery cell is higher than the capacity of the second battery cell. The higher FCC of the first battery cell results from additional capacity contribution from decomposition of pre-lithiation reagents disposed on a cathode of the first battery cell. The FDC of the second battery cell is higher than the FDC of the first battery cell and the FCE is also higher for the second battery cell than the first battery cell. The capacity comparison provided by Table 1 indicates that the electrolyte additive effectively passivates a pre-lithiation reagent (and pre-lithiation catalysts) of the cathode while increasing a cycling capacity and efficiency of the battery cell.

Benefits imparted by an electrolyte additive is further supported by a comparison of first cycle voltage profiles with and without a passivation layer formed from the electrolyte additive. For example, a first graph 800 plotting first voltage profiles for each cell of a first battery, where the cells of the first battery are analogous to the first battery cell of Table 1, is depicted in FIG. 8. A second graph 900 plotting first voltage profiles for each cell of a second battery, where the cells of the second battery analogous to the second battery cell of Table 2, is depicted in FIG. 9. The electrolyte additive is LiDFOP.

In the first graph 800 of FIG. 8, a set of charge cycle voltage profiles 802 and a set of discharge cycle voltage profiles 804 are shown. The set of charge cycle voltage profiles 802 includes a region where the voltage plateaus, as indicated by dashed region 806, due to decomposition of a cathode pre-lithiation reagent. The second graph 900 of FIG. 9 similarly shows a set of charge cycle voltage profiles 902 and a set of discharge cycle voltage profiles 904. At a region indicated by dashed region 906, a plateau is not observed. Comparison of the first and second graphs 800 and 900 indicate that decomposition of the pre-lithiation reagent does not occur in the second battery cell due to formation of the passivation layer, as demonstrated by a lack of a plateau in the second graph 900.

In this way, battery cell performance may be enhanced. An electrolyte additive may be added to the battery cell to create a passivation layer over a non-decomposed pre-lithiation reagent of the battery cell cathode. The passivation layer may also coat pre-lithiation catalysts used to promote decomposition of the pre-lithiation reagent during a formation cycle of the battery cell, as well as other materials forming the cathode, such as a cathode active material and one or more conductive additives or fillers. The passivation layer may be formed of one or more electrolyte additives and may reduce both gas generation in the battery cell, resulting from decomposition of the pre-lithiation reagent during battery cell operation, and impedance growth. Use of the electrolyte additive to deactivate the pre-lithiation reagent may be a low cost, effective strategy to increase an electrochemical performance of the battery cell that can be readily scaled up to larger cell formats.

The inventors have identified issues of gas generation at a lithium-ion battery cell during cycling when a pre-lithiated cathode with a pre-lithiation reagent or a pre-lithiation reagent containing a catalyst is used, and have provided addressed this issue by injecting an electrode additive into an electrolyte to form a passivation layer at the pre-lithiated cathode. The passivation layer is generated during a first charging phase and formed at both an electrode level and a particle level, which may inhibit continued decomposition of the pre-lithiation reagent after completion of a formation cycle of the lithium-ion battery cell. In this way, undesirable reactions of the pre-lithiated reagent with electrolyte may be circumvented.

Additionally, the embodiments show (1) formation of a passivation layer over constituents of a pre-lithiated electrode (as show in FIG. 1), (2) coating of a pre-lithiated electrode (as shown in FIGS. 2A-2B), (3) formation of a passivation layer of electrolyte additives (as shown in FIGS. 3A-3B), (4) a detailed view of particles of the electrode after forming a passivation layer (as shown in FIG. 4), (5) methods for passivating a pre-lithiated cathode (as shown in FIGS. 5-7), and (6) demonstration of the first electrical performance of charging and discharging with a non-passivation layer and a passivation layer, respectively (as shown in FIGS. 8-9).

The disclosure also provides support for a method for forming a cathode for a lithium-ion battery cell, comprising: forming a pre-lithiated cathode with a pre-lithiation reagent, positioning the pre-lithiated cathode in contact with an electrolyte, injecting an electrolyte additive into the electrolyte to form a passivation layer at the pre-lithiated cathode, the passivation layer inhibiting continued decomposition of the pre-lithiation reagent of the pre-lithiated cathode after completion of a formation cycle of the lithium-ion battery cell. In a first example of the method, injecting the electrolyte additive to form the passivation layer further includes inhibiting activity of a catalyst, the catalyst used to expedite decomposition of the pre-lithiation reagent. In a second example of the method, optionally including the first example, injecting the electrolyte additive includes injecting one or more of a borate, a sultone, a fluorinate, an anhydride, a phosphorous-based compound, a cyano compound, an unsaturated alkyl compound, lithium bis(oxolato)borate (LiBOB), lithium 4-pyridyl trimethyl borate (LPTB), lithium tetrafluoroborate (LiBF4), lithium oxalyldifluoroborate (LiDFOB), lithium tetrafluorooxalatophosphate (LiTFOP), lithium hexafluorophosphate (LiPF$_6$), lithium di(trifluoromethanesulfonyl)imide (LiTFSI), lithium di(fluorosulfonyl)imide (LiFSI), diisopropylfluorophosphate (DFP), lithium difluoro bis(oxalate)phosphate (LiDFOP), and a blend thereof. In a third example of the method, optionally including one or both of the first and second examples, injecting the electrolyte additive includes adding an amount of the electrolyte additive within a range of 0.01% to 10% of a mass of the electrolyte and adding a lithium salt with a concentration within a range of 0.5 M to 2.0 M in the electrolyte. In a fourth example of the method, optionally including one or more or each of the first through third examples, injecting the electrolyte to form the passivation layer includes forming a layer with a content within a range of 0.01% to 5% of a mass of chemical components of the lithium-ion battery cell, the chemical components including the electrolyte, the pre-lithiated cathode, and an anode. In a fifth example of the method, optionally including one or more or each of the first through fourth examples, injecting the electrolyte additive to form the passivation layer includes forming the passivation layer over surfaces of the pre-lithiated cathode and over particles forming the pre-lithiated cathode, and wherein the particles forming the pre-lithiated cathode includes particles of the pre-lithiation reagent that do not decompose after the formation cycle, particles of a cathode active material, particles of a catalyst, and particles of a conductive additive. In a sixth example of the method, optionally including one or more or each of the first through fifth examples, injecting the electrolyte additive to form the passivation layer includes forming a barrier between the pre-lithiated cathode and the electrolyte to inhibit the continued decomposition of the pre-lithiation reagent during lithium-ion battery cell cycling subsequent to the formation cycle.

The disclosure also provides support for a lithium-ion battery cell, comprising: an electrolyte, a cathode in contact with the electrolyte and coated with a pre-lithiation reagent, and an electrolyte additive added to the electrolyte, the electrolyte additive forming a passivation layer over the pre-lithiation reagent after an initial charging of the lithium-ion battery cell. In a first example of the system, the pre-lithiation reagent is one or more of Li3N, Li2O, Li2O2, Li2S, Li5FeO4, a Li2S/M nanocomposite, a LiF/M nanocomposite, and a Li2O/metal nanocomposite. In a second example of the system, optionally including the first example, the electrolyte is formed of 10%-40% ethylene carbonate, 20%-40% dimethyl carbonate, 20%-40% diethyl carbonate, and 30%-50% ethyl methyl carbonate. In a third example of the system, optionally including one or both of the first and second examples, the passivation layer forms at least one of a partial coating over surfaces of the cathode and particles forming the cathode and a complete coating over the surfaces of the cathode and the particles forming the cathode. In a fourth example of the system, optionally including one or more or each of the first through third examples, the cathode includes one or more catalysts configured to expedite decomposition of the pre-lithiation reagent, and wherein the passivation layer is a barrier between the one or more catalysts and the electrolyte. In a fifth example of the system, optionally including one or more or each of the first through fourth examples, the passivation layer is formed when the electrolyte additive oxidizes during the initial charging of the lithium-ion battery cell. In a sixth example of the system, optionally including one or more or each of the first through fifth examples, the passivation layer inhibits gas generation by the pre-lithiation reagent and impedance growth of the lithium-ion battery cell, the impedance growth due to surface restructuring at an active material of the cathode. In a seventh example of the system, optionally including one or more or each of the first through sixth examples, the passivation layer has a thickness within a range of 0.1 nm to 20 nm, and wherein the thickness of the passivation layer varies according to a type of particle coated by the passivation layer. In an eighth example of the system, optionally including one or more or each of the first through seventh examples, the passivation layer has a thickness of less than 10 nm.

The disclosure also provides support for a method for forming a lithium-ion battery cell, comprising: assembling components of the lithium-ion battery cell, the components including a pre-lithiated cathode with a pre-lithiation layer formed of a pre-lithiation reagent, adding an electrolyte to the lithium-ion battery cell, the electrolyte in contact with the pre-lithiated cathode, and injecting an electrolyte additive into the electrolyte to form a passivation layer over the pre-lithiation reagent of the pre-lithiated cathode, the passivation layer inhibiting gas formation by the pre-lithiation reagent. In a first example of the method, injecting the electrolyte additive into the electrolyte includes injecting the electrolyte additive before conducting a formation cycle of the lithium-ion battery cell, and wherein the passivation layer is also formed over a pre-lithiation catalyst, a cathode active material, and a conductive filler of the pre-lithiated cathode. In a second example of the method, optionally including the first example, injecting the electrolyte additive into the electrolyte includes injecting the electrolyte additive after conducting a formation cycle of the lithium-ion battery cell, and wherein the passivation layer is also formed over a pre-lithiation catalyst, a cathode active material, and a conductive filler of the pre-lithiated cathode. In a third example of the method, optionally including one or both of the first and second examples, injecting the electrolyte additive into the electrolyte to form the passivation layer includes inhibiting electrolyte oxidation at a material of the pre-lithiated cathode, the material of the pre-lithiated cathode including one or more of the pre-lithiation reagent, a catalyst, a cathode active material, and a conductive additive.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for forming a cathode for a lithium-ion battery cell, comprising:
   forming a pre-lithiated cathode with a pre-lithiation reagent;
   positioning the pre-lithiated cathode in contact with an electrolyte; and
   injecting an electrolyte additive into the electrolyte to form a passivation layer at the pre-lithiated cathode, the passivation layer inhibiting continued decomposition of the pre-lithiation reagent of the pre-lithiated cathode after completion of a formation cycle of the lithium-ion battery cell.

2. The method of claim 1, wherein injecting the electrolyte additive to form the passivation layer further includes inhibiting activity of a catalyst, the catalyst used to expedite decomposition of the pre-lithiation reagent.

3. The method of claim 1, wherein injecting the electrolyte additive includes injecting one or more of a borate, a sultone, a fluorinate, an anhydride, a phosphorous-based compound, a cyano compound, an unsaturated alkyl compound, lithium bis(oxalato)borate (LiBOB), lithium 4-pyridyl trimethyl borate (LPTB), lithium tetrafluoroborate (LiBF$_4$), lithium oxalyldifluoroborate (LiDFOB), lithium tetrafluorooxalatophosphate (LiTFOP), lithium hexafluorophosphate (LiPF$_6$), lithium di(trifluoromethanesulfonyl)imide (LiTFSI), lithium di(fluorosulfonyl)imide (LiFSI), diisopropylfluorophosphate (DFP), lithium difluoro bis(oxalate) phosphate (LiDFOP), and a blend thereof.

4. The method of claim 1, wherein injecting the electrolyte additive includes adding an amount of the electrolyte additive within a range of 0.01% to 10% of a mass of the electrolyte and adding a lithium salt with a concentration within a range of 0.5 M to 2.0 M in the electrolyte.

5. The method of claim 1, wherein injecting the electrolyte to form the passivation layer includes forming a layer with a content within a range of 0.01% to 5% of a mass of chemical components of the lithium-ion battery cell, the chemical components including the electrolyte, the pre-lithiated cathode, and an anode.

6. The method of claim 1, wherein injecting the electrolyte additive to form the passivation layer includes forming the passivation layer over surfaces of the pre-lithiated cathode and over particles forming the pre-lithiated cathode, and wherein the particles forming the pre-lithiated cathode includes particles of the pre-lithiation reagent that do not decompose after the formation cycle, particles of a cathode active material, particles of a catalyst, and particles of a conductive additive.

7. The method of claim 1, wherein injecting the electrolyte additive to form the passivation layer includes forming a barrier between the pre-lithiated cathode and the electrolyte to inhibit the continued decomposition of the pre-lithiation reagent during lithium-ion battery cell cycling subsequent to the formation cycle.

8. A lithium-ion battery cell, comprising:
   an electrolyte;
   a cathode in contact with the electrolyte and coated with a pre-lithiation reagent;
   an electrolyte additive added to the electrolyte; and
   a passivation layer coating the pre-lithiation reagent after an initial charging of the lithium-ion battery cell, wherein the passivation layer is formed of oxidized electrolyte additive.

9. The lithium-ion battery cell of claim 8, wherein the pre-lithiation reagent is one or more of Li$_3$N, Li$_2$O, Li$_2$O$_2$, Li$_2$S, LisFeO$_4$, a Li$_2$S/M nanocomposite, a LiF/M nanocomposite, and a Li$_2$O/metal nanocomposite.

10. The lithium-ion battery cell of claim 8, wherein the electrolyte is formed of 10%-40% ethylene carbonate, 20%-40% dimethyl carbonate, 20%-40% diethyl carbonate, and 30%-50% ethyl methyl carbonate.

11. The lithium-ion battery cell of claim 8, wherein the passivation layer forms at least one of a partial coating over surfaces of the cathode and particles forming the cathode and a complete coating over the surfaces of the cathode and the particles forming the cathode.

12. The lithium-ion battery cell of claim 8, wherein the cathode includes one or more catalysts configured to expedite decomposition of the pre-lithiation reagent, and wherein the passivation layer is a barrier between the one or more catalysts and the electrolyte.

13. The lithium-ion battery cell of claim 8, wherein the passivation layer inhibits gas generation by the pre-lithiation reagent and impedance growth of the lithium-ion battery cell, the impedance growth due to surface restructuring at an active material of the cathode.

14. The lithium-ion battery cell of claim 8, wherein the passivation layer has a thickness within a range of 0.1 nm to 20 nm, and wherein the thickness of the passivation layer varies according to a type of particle coated by the passivation layer.

15. The lithium-ion battery cell of claim 8, wherein the passivation layer has a thickness of less than 10 nm.

16. A method for forming a lithium-ion battery cell, comprising:
   assembling components of the lithium-ion battery cell, the components including a pre-lithiated cathode with a pre-lithiation layer formed of a pre-lithiation reagent;
   adding an electrolyte to the lithium-ion battery cell, the electrolyte in contact with the pre-lithiated cathode; and
   injecting an electrolyte additive into the electrolyte to form a passivation layer over the pre-lithiation reagent of the pre-lithiated cathode, the passivation layer inhibiting gas formation by the pre-lithiation reagent.

17. The method of claim 16, wherein injecting the electrolyte additive into the electrolyte includes injecting the electrolyte additive before conducting a formation cycle of the lithium-ion battery cell, and wherein the passivation layer is also formed over a pre-lithiation catalyst, a cathode active material, and a conductive filler of the pre-lithiated cathode.

18. The method of claim 16, wherein injecting the electrolyte additive into the electrolyte includes injecting the electrolyte additive after conducting a formation cycle of the lithium-ion battery cell, and wherein the passivation layer is also formed over a pre-lithiation catalyst, a cathode active material, and a conductive filler of the pre-lithiated cathode.

19. The method of claim 16, wherein injecting the electrolyte additive into the electrolyte to form the passivation layer includes inhibiting electrolyte oxidation at a material of the pre-lithiated cathode, the material of the pre-lithiated cathode including one or more of the pre-lithiation reagent, a catalyst, a cathode active material, and a conductive additive.

* * * * *